United States Patent
Abernathy

(10) Patent No.: US 10,037,723 B2
(45) Date of Patent: Jul. 31, 2018

(54) FAULT-TOLERANT LCD DISPLAY

(71) Applicant: L-3 COMMUNICATIONS CORPORATION, New York, NY (US)

(72) Inventor: Michael G. Abernathy, Ellijay, GA (US)

(73) Assignee: L3 COMMUNICATIONS CORP., New York, NY (US)

( * ) Notice: Subject to any disclaimer, the term of this patent is extended or adjusted under 35 U.S.C. 154(b) by 0 days.

(21) Appl. No.: 15/266,556

(22) Filed: Sep. 15, 2016

(65) Prior Publication Data

US 2018/0075790 A1 Mar. 15, 2018

(51) Int. Cl.
| | |
|---|---|
| *G06F 3/038* | (2013.01) |
| *G09G 5/00* | (2006.01) |
| *G09G 3/00* | (2006.01) |
| *G09G 3/36* | (2006.01) |
| *G02F 1/1368* | (2006.01) |
| *G02F 1/1362* | (2006.01) |

(52) U.S. Cl.
CPC ............ *G09G 3/006* (2013.01); *G02F 1/1368* (2013.01); *G02F 1/136204* (2013.01); *G09G 3/3677* (2013.01); *G09G 3/3688* (2013.01); *G02F 2201/506* (2013.01); *G09G 2330/08* (2013.01)

(58) Field of Classification Search
CPC .......... G09G 2300/026; G09G 3/2092; G09G 3/3644; G09G 2310/0221; G09G 3/20; G09G 3/3666; Y10S 345/903
See application file for complete search history.

(56) References Cited

U.S. PATENT DOCUMENTS

| | | | |
|---|---|---|---|
| 2007/0152951 A1* | 7/2007 | Ahn ....................... | G09G 3/342 345/102 |
| 2008/0165301 A1 | 7/2008 | Chang et al. | |
| 2009/0315876 A1* | 12/2009 | Ichikawa ............. | G09G 3/3666 345/213 |
| 2013/0176318 A1 | 7/2013 | Dunn et al. | |
| 2016/0027372 A1 | 1/2016 | Yan | |

FOREIGN PATENT DOCUMENTS

CN 105321444 2/2016

OTHER PUBLICATIONS

International Search Report, dated Nov. 29, 2017, issued by the European Patent Office for related international patent application PCT/US2017/051363.

\* cited by examiner

*Primary Examiner* — Insa Sadio

(74) *Attorney, Agent, or Firm* — Dickinson Wright PLLC

(57) ABSTRACT

A fault-tolerant LCD display system comprises an LCD panel and a first driver coupled to the LCD panel and including a first gate driver and a first source driver, the first driver including a first transient voltage suppressor. A second driver is also coupled to the LCD panel and includes a second gate driver and a second source driver, the second driver including a second transient voltage suppressor. One of the first and second drivers is operable to be active while the other is inactive, and vice versa, and the first and second drivers are isolated from one another. The first and second transient voltage suppressors are operable to prevent a back biasing voltage from leaking back through the inactive driver and thus the transient voltage suppressors are operative to prevent a back biasing voltage from shunting through the non-active driver.

8 Claims, 5 Drawing Sheets

FAULT-TOLERANT LCD DISPLAY

BACKGROUND

Fault-tolerant Active Matrix Liquid Crystal Displays (AMLCDs) are useful for flight-critical, primary aircraft cockpit displays where safety and high reliability are of the utmost importance. Such can be the case for both military and commercial aircraft platforms. However, the desired fault tolerance presents significant challenges. Generally speaking, fault tolerance in this context typically refers to the ability of the system to function despite a failure such that a single point of failure doesn't render the system inoperative. As the lives of flight crews can depend on the display, it is important that the system be reliable.

U.S. Pat. Nos. 7,295,179 and 7,728,788 both present possible approaches to fault tolerance through simple redundancy. U.S. Pat. No. 7,295,179 describes a liquid crystal display with two identical but totally electrically isolated left and right side displays residing on one single glass substrate. Under this arrangement, if a fault occurs in one side of the composite display (in one of the displays), the other side will still be operational. Thus, in this arrangement, the two displays can be driven to appear as one display and if one of the displays fails, the failing display is simply turned off and the other display continues (but with now only half of the total display area of the two displays working together). So in essence, a fault in the left or right (or top or bottom) portion of the composite display can be isolated to the left or the right (or top or bottom) portion and does not render the entire display unusable.

The approach put forward in U.S. Pat. No. 7,728,788 partitions the liquid crystal display into multiple sections which are driven by independent sources. Fault tolerance is achieved somewhat in that if one section fails, the remaining section(s) can remain operational.

The approach put forward in Republic of Korea patent 10-1999-0052420 adds data lines for the purpose of improving manufacturing yield and allows dual gate drive which helps overcome internal propagation delay times in the long axis of the display.

Unfortunately, if a fault occurs in the above solutions, typically there is some amount of the original (display) information lost, but the display system might yet still display enough information for the flight crew to return home safely. Accordingly, it can be seen that a need yet remains for a robust fault-tolerant display system. It is to the provision of such that the present invention is primarily directed.

SUMMARY OF THE INVENTION

In one example form, the present invention relates to a fault-tolerant LCD display system including an LCD panel and a first driver coupled to the LCD panel and including a first gate driver and a first source driver, the first driver including a first transient voltage suppressor. A second driver is also coupled to the LCD panel and includes a second gate driver and a second source driver, the second driver including a second transient voltage suppressor. One of the first and second drivers is operable to be active while the other is inactive, and vice versa, and the first and second drivers are isolated from one another. The first and second transient voltage suppressors are operable to prevent a back biasing voltage from leaking back through the inactive driver and thus the transient voltage suppressors are operative to prevent a back biasing voltage from shunting through the inactive driver.

Preferably, the first driver and the second gate/source driver pair each have their own independent power supplies, independent from one another. In this way, if one of the drivers fails due to some fault, the other driver can continue to drive the LCD panel without a loss of information despite the failure of the one driver.

Preferably, the first and second transient voltage suppressors of each gate or source line comprise a pair of Zener diodes. More preferably, each pair of Zener diodes comprises Zener diodes pointed at one another and arranged in a P-N-P arrangement.

In a preferred form, the drivers are implemented in driver chips.

Preferably, the first and second gate/source driver pairs each comprises a signal line and a VSS, and wherein the first and second transient voltage suppressors in each gate/source line are each interposed between the signal line and the VSS.

Preferably, if one of the four drivers fails due to some fault, the other driver pair can continue to drive the LCD panel without loss of information despite the failure of the one gate/source driver pair.

Optionally, the first gate/source driver pair and the second gate/source driver pair each has its own independent power supply, independent from one another.

Optionally, the LCD panel comprises a thin film transistor display. Optionally, the LCD panel can comprise an AMLCD display.

BRIEF DESCRIPTION OF THE DRAWING FIGURES

DETAILED DESCRIPTION OF THE EXAMPLE EMBODIMENTS

Figure 1:
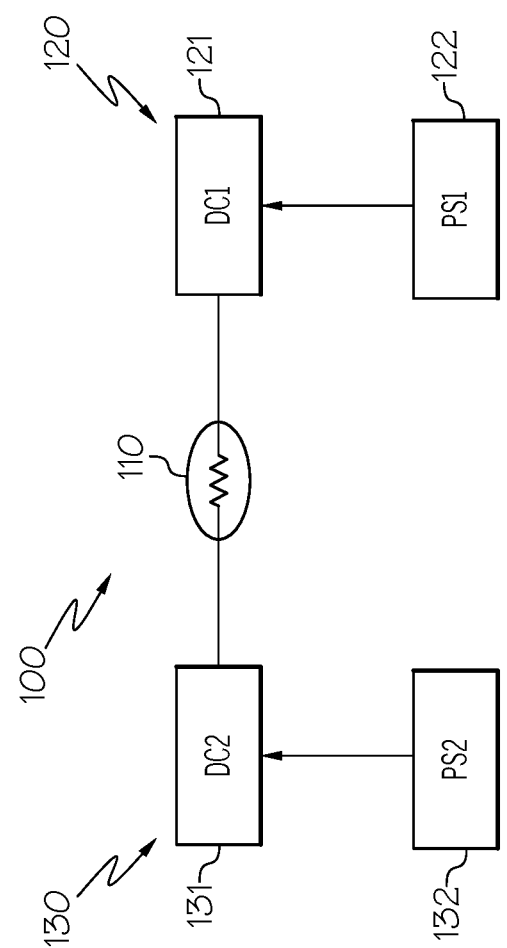
FIG. 1 is a schematic illustration of a fault-tolerant display system according to a preferred example form of the present invention.
Figure 2:
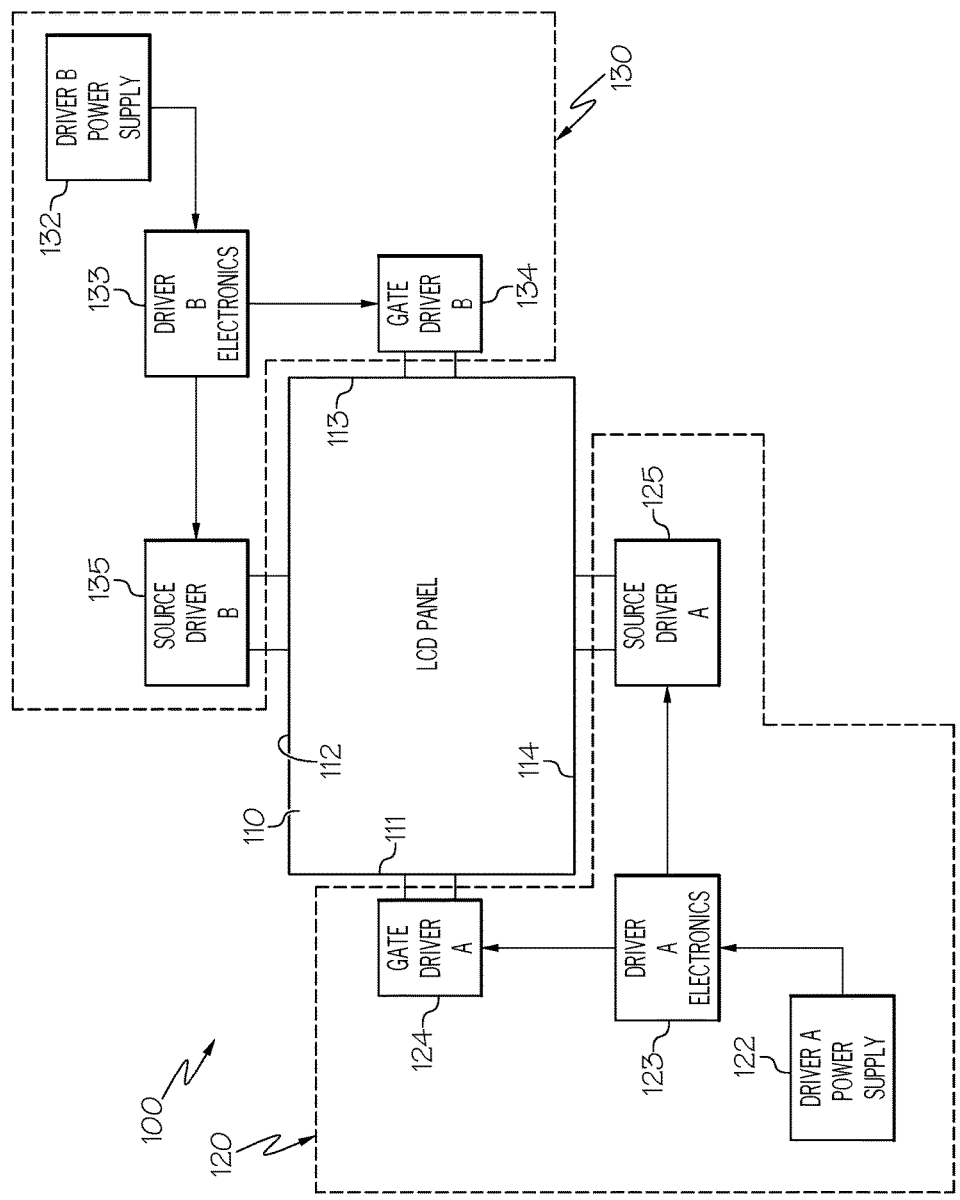
FIG. 2 is a more detailed schematic illustration of the fault-tolerant display system of FIG. 1.

Referring now in detail to the drawing figures, where like reference numerals represent like parts throughout the several views, FIGS. 1 and 2 show a fault-tolerant display system 100 according to a preferred example form of the present invention, showing an AMLCD display panel 110 having its pixels driven alternatively by two separate driver sets 120, 130. Preferably, the display panel 110 comprises a TFT display (thin film transistor). Although an AMLCD panel is shown, the fault-tolerant display system can also be another other type of display, such as OLED, electrophoretic, QLED, micro-LED, etc.).

The first driver set 120 includes a driver chip DC1 designated at 121 and a first power supply 122 (labeled PS1 in the box). The driver chip 121 includes a Source Driver and a Gate Driver, as well as associated driver electronics. Likewise, the second driver set 130 includes a second driver chip DC2 designated at 131 and a second power supply 132 (labeled PS2 in the box). The second driver chip 131 includes a Source Driver and a Gate Driver, as well as associated driver electronics.

The first driver 121 and the second driver 131 feed into the AMLCD panel 110 from opposite directions. In particular, the AMLCD panel 110 optionally has four edges 111-114 and the gate drivers and source drivers that are part of the first and second driver sets 121, 131 are fed into the AMLCD display panel 110 along the four edges. For illustrative purposes in FIG. 2, the feeds are only schematically depicted.

The display panel 110 can be a TFT display having a typical horizontal resolution of 1920 each red, green, and blue subpixels in each line and a typical vertical resolution of 1080 lines (1920×RGB×1080). Also, the first driver electronics 123 can include an input connector, timing controller, power supply, and built in test (BIT) functions, and the gamma voltage divider function. The input connector electrically couples the digital video input signal (LVDS, DisplayPort, MIPI, etc.) to the timing controller and power supply. In turn, timing controller power supply is coupled to the gate driver and to the source driver. The gamma voltage divider function is connected to the source driver.

Similarly, the second driver electronics 133 can include an input connector, the timing controller, power supply, and built in test (BIT) functions, and a gamma voltage divider function. The input connector electrically couples the digital video input signal (LVDS, DisplayPort, MIPI, etc.) to the timing controller and power supply. In turn, the timing controller power supply is coupled to the second gate driver and to the second source driver. The gamma voltage divider function is connected to the second source driver.

Inasmuch as the two driver pairs 120, 130 each have their own independent power supply (see 122, 132), they each have their own $V_{com}$.

Advantageously, the present invention provides improved, superior redundancy, by driving the display redundantly. This redundancy allows for full screen operation even with a fault. Thus, a single-point of failure condition is avoided and the display panel (be it an AMLCD or any TFT-based display) can still provide all of the original information presented prior to the occurrence of the fault. The display is redundantly driven by two driver chips (121, 131). Also, each transistor is redundantly driven by two source drivers (122, 132). Thus, if one of the drivers fails, the other is sufficient to continue to drive the display.

FIG. 2 shows a typical example of the physical layout of the fault tolerant display which illustrates the two driver sets (each consisting of driver electronics, source drivers and gate drivers connected together via a flex printed circuit (FPC)) located external to the AMLCD panel. Alternate configurations of this invention may incorporate either some or all of the components of the two driver sets (driver electronics, source drivers, gate drivers, etc.) located directly on the AMLCD or other TFT-based display panel.

Figure 3A:
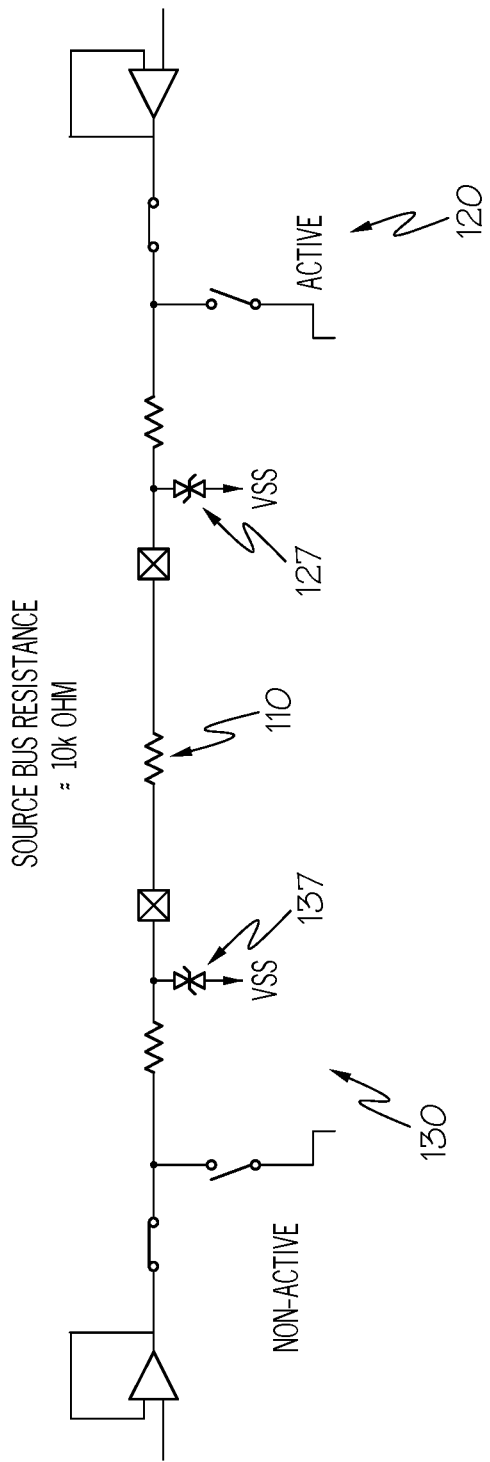
FIG. 3A is a detailed schematic illustration of a portion of the fault-tolerant display system of FIG. 1 configured with one transient voltage suppressor for each gate/source driver pair.

FIG. 3A shows details of the example embodiment in which the AMLCD display panel 110 has its pixels driven alternatively by two separate driver sets 120, 130. As seen in this figure, the two driver sets 120, 130 are electrically isolated from one another (and as previously shown, have separate power supplies 122, 132). To prevent a back biasing voltage from leaking back through the inactive driver and thus the transient voltage suppressors are operative to prevent a back biasing voltage from shunting through the non-active drive, transient voltage suppression (TVS) devices are included in the circuitry of each driver set 120, 130. In this configuration of FIG. 3A, the drivers are configured such that each is provided with one transient voltage suppressor for each gate/source driver pair.

In this regard, a first driver 120 is coupled to the LCD panel 110 and includes a first gate driver and a first source driver. Moreover, the first driver 120 includes a first transient voltage suppressor 127 positioned between the VSS line and the signal line. Similarly, the second driver 130 includes a second transient voltage suppressor 137 positioned between its VSS line and its signal line. Likewise, the second driver 130 is coupled to the LCD panel 110 and includes a second gate driver and a second source driver. The second driver 130 includes a second transient voltage suppressor 137 positioned between the associated VSS line and signal line.

In such an arrangement, one of the first and second drivers is operable to be active while the other is inactive, and vice versa. As depicted in FIG. 3A, the first driver 120 is depicted as "active" while the second driver 130 is not.

Preferably, the first and second transient voltage suppressors 127, 137 each comprise a pair of Zener diodes. Most preferably, each of the pair of Zener diodes comprises Zener diodes pointed at one another and arranged in a P-N-P arrangement.

As shown, preferably the first and second drivers 120, 130 each comprise driver chips.

Figure 3B:
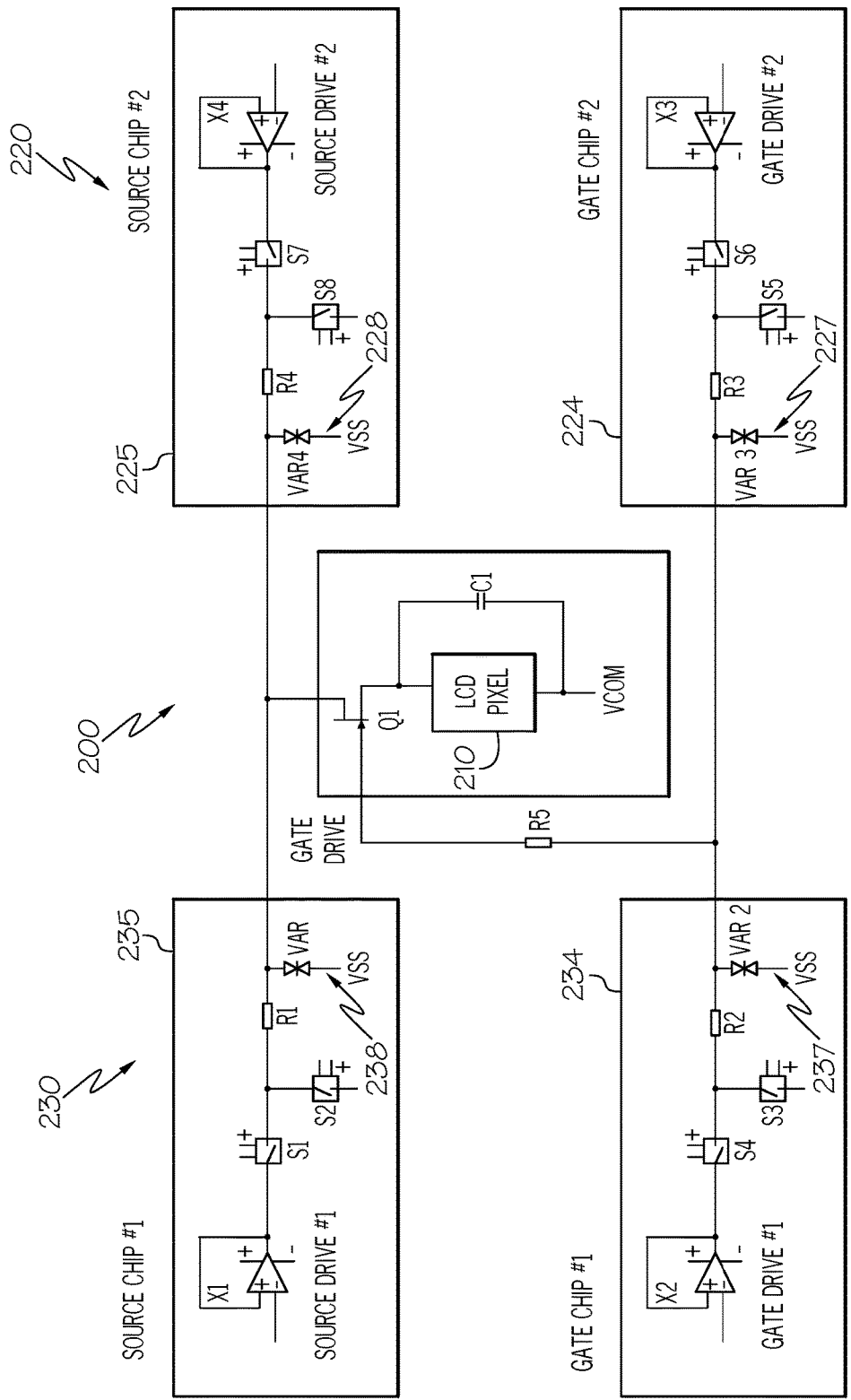
FIG. 3B is a detailed schematic illustration of a portion of the fault-tolerant display system of FIG. 1 and configured with a transient voltage suppressor for each gate driver and for each source driver.

FIG. 3B shows details of another example embodiment in which the AMLCD display panel 210 has its pixels driven alternatively by two separate driver sets 220, 230. As seen in this figure, the two driver sets 220, 230 are electrically isolated from one another (and as previously described, have separate power supplies). To prevent a back biasing voltage from leaking back through the inactive driver and thus the transient voltage suppressors are operative to prevent a back biasing voltage from shunting through the non-active drive, transient voltage suppression (TVS) devices are included in the circuitry of each driver set 220, 230. In this configuration of FIG. 3B, the drivers are configured such that each gate driver and each source driver is provided with its own transient voltage suppressor. In such an arrangement, one of the first and second drivers is operable to be active while the other is inactive, and vice versa.

In this regard, a first driver pair 220 is coupled to the LCD panel 210 and includes a first gate driver 224 and a first source driver 225. Moreover, the first gate driver 224 includes a transient voltage suppressor 227 positioned between its VSS line and the signal line. Likewise, the first source driver 225 includes a transient voltage suppressor 228 positioned between its VSS line and the signal line.

Similarly, the second driver pair 230 is coupled to the LCD panel 210 and includes a second gate driver 234 and a second source driver 235. Moreover, the second gate driver 234 includes a transient voltage suppressor 237 positioned between its VSS line and the signal line. Likewise, the second source driver 235 includes a transient voltage suppressor 238 positioned between its VSS line and the signal line.

Preferably, the transient voltage suppressors 227, 228, 237, and 238 each comprise a pair of Zener diodes. Most preferably, each of the pair of Zener diodes comprises Zener diodes pointed at one another and arranged in a P-N-P arrangement.

Advantageously, the two driver sets 120, 130 (and 220, 230) are electrically isolated from one another to prevent a back biasing voltage from leaking back through the inactive driver and thus the transient voltage suppressors are operative to prevent a back biasing voltage from shunting through the non-active driver.

Advantageously, if one of the drivers 120, 130, 220, 230 fails due to some fault, the other driver can continue to drive the LCD panel 110 without loss of information despite the failure of the one driver.

Advantageously, these arrangements provide both maximum availability of the display and maximum integrity of the data/images displayed thereon. In aircraft applications, this can be critically important.

There is an advantage to providing the required isolation at the driver chip level rather than implementing isolation on the ALMCD glass substrate. Providing isolation at the chip level, as shown in the disclosed example embodiment, allows the use of amorphous silicon AMLCDs rather than LTPS, and reduces the amount of circuitry needed to shut down source and gate drivers.

Figure 4:
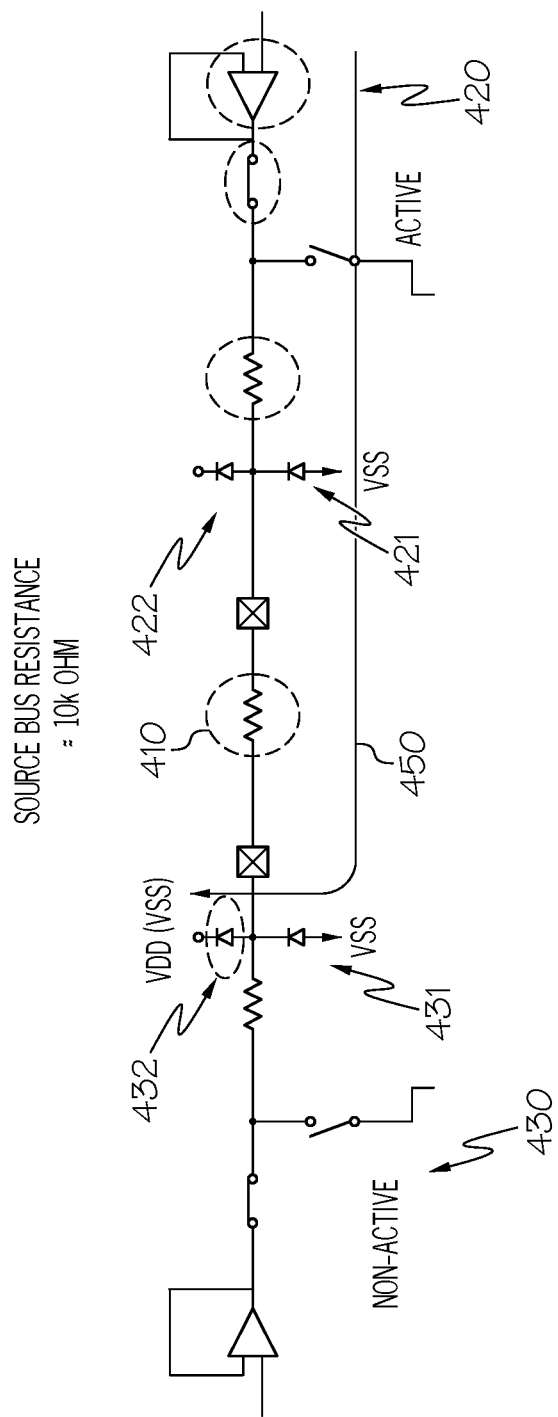
FIG. 4 is a schematic illustration of a display system according to an alternative, conventional arrangement.

If traditional ESD (electro-static discharge) protection at the outputs of the source and gate drives chips were to be applied to the present problem, such could be done as illustrated in the FIG. 4 (which depicts a more conventional arrangement without the TVS features that prevent back biasing). As shown therein, a display 410 is driven by a first driver 420 and a second driver 430. In each driver, a diode 421, 431 is positioned between the signal line and the VSS, while another diode 422, 432 is between the signal and VDD. The figure illustrates that large currents will flow in the indicated path 450 if one side is shut down and the other is active if no isolation between the active and non-active drivers is provided. Without proper isolation, the operational driver can forward bias the signal to the VDD ESD diode on the non-active side and cause an excessive current draw which leads to overheating and eventual chip failure.

It is to be understood that this invention is not limited to the specific devices, methods, conditions, or parameters described and/or shown herein, and that the terminology used herein is for the purpose of describing particular embodiments by way of example only. Indeed, these examples are not intended to be all-inclusive of the possible implementations of this invention. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A fault-tolerant LCD display system comprising:
   an LCD panel;
   a first driver coupled to the LCD panel and including a first gate driver and a first source driver, the first driver including a first source driver transient voltage suppressor and a first gate driver transient voltage suppressor;
   a second driver coupled to the LCD panel and including a second gate driver and a second source driver, the second driver including a second source driver transient voltage suppressor and a second gate driver transient voltage suppressor; and
   wherein one of the first and second gate/source driver pairs are operable to be active while the other pair is inactive, and vice versa, and wherein the first and second gate/source driver pairs are isolated from one another and wherein the first and second transient voltage suppressors are operable to prevent a back biasing voltage from leaking back through the inactive pair driver and thus the transient voltage suppressors are operative to prevent a back biasing voltage from shunting through the inactive gate/source driver pair.

2. A fault-tolerant LCD display system as claimed in claim 1 wherein the first and second driver pair's transient voltage suppressors each comprise a pair of Zener diodes.

3. A fault-tolerant LCD display system as claimed in claim 2 wherein the each of the pair of Zener diodes comprise Zener diodes pointed at one another and arranged in a P-N-P arrangement.

4. A fault-tolerant LCD display system as claimed in claim 1 wherein the first and second driver pairs each comprises driver chips.

5. A fault-tolerant LCD display system as claimed in claim 1 wherein the first and second driver pairs each comprises a signal line and a VSS, and wherein the first and second transient voltage suppressor pairs are each interposed between the signal line and the VSS.

6. A fault-tolerant LCD display system as claimed in claim 1 wherein if one of the gate/source driver pairs fails due to some fault, the other gate/source driver pair can continue to drive the LCD panel without loss of information despite the failure of the one gate/source driver pair.

7. A fault-tolerant LCD display system as claimed in claim 6 wherein the first driver and the second driver pairs each have its own independent power supply, independent from one another.

8. A fault-tolerant LCD display system as claimed in claim 1 wherein the LCD panel comprises a thin film transistor display.

* * * * *